United States Patent
Bani Shamseh et al.

(10) Patent No.: US 11,601,068 B2
(45) Date of Patent: Mar. 7, 2023

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Mohammad Bani Shamseh, Tokyo (JP); Issei Fukasawa, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 12 days.

(21) Appl. No.: 17/602,896

(22) PCT Filed: Oct. 9, 2019

(86) PCT No.: PCT/JP2019/039874
§ 371 (c)(1),
(2) Date: Oct. 11, 2021

(87) PCT Pub. No.: WO2021/070295
PCT Pub. Date: Apr. 15, 2021

(65) Prior Publication Data
US 2022/0200481 A1 Jun. 23, 2022

(51) Int. Cl.
*H02M 7/539* (2006.01)
*H02M 1/32* (2007.01)
(Continued)

(52) U.S. Cl.
CPC .............. *H02M 7/539* (2013.01); *H02J 3/01* (2013.01); *H02J 3/26* (2013.01); *H02J 3/381* (2013.01);
(Continued)

(58) Field of Classification Search
CPC ...... H02M 7/539; H02M 7/5395; H02M 7/54; H02M 7/53875; H02M 7/53871;
(Continued)

(56) References Cited

U.S. PATENT DOCUMENTS

| | | | |
|---|---|---|---|
| 2002/0103110 A1* | 8/2002 | Spitzer | A61K 31/19 514/1 |
| 2016/0036874 A1* | 2/2016 | Mezhibovsky | G06Q 10/06314 705/7.19 |
| 2019/0344824 A1* | 11/2019 | Takase | H02P 21/22 |

FOREIGN PATENT DOCUMENTS

| | | |
|---|---|---|
| CN | 101944840 A | 1/2011 |
| EP | 3 435 510 A1 | 1/2019 |

OTHER PUBLICATIONS

European Office Action dated Feb. 1, 2022 in European Patent Application No. 19 856 439.5, 10 pages.
(Continued)

*Primary Examiner* — Nguyen Tran
(74) *Attorney, Agent, or Firm* — Oblon, McClelland, Maier & Neustadt, L.L.P.

(57) ABSTRACT

A power conversion device includes a power conversion circuit and a power conversion control circuit. The power conversion control circuit is configured to calculate a positive-phase sequence current command signal based on a positive-phase sequence voltage of the three-phase AC output voltage and a positive-phase sequence current of the three-phase AC output current, calculate a negative-phase sequence current command signal based on the first axis negative-phase sequence current command value, the second axis negative-phase sequence current command value, the first axis negative-phase sequence current value, and the second axis negative-phase sequence current value, and generate the switching control signal based on the positive-phase sequence current command signal and the negative-phase sequence current command signal.

5 Claims, 7 Drawing Sheets

(51) Int. Cl.
*H02M 1/00* (2006.01)
*H02J 3/01* (2006.01)
*H02J 3/26* (2006.01)
*H02J 3/38* (2006.01)
*H02M 1/12* (2006.01)

(52) U.S. Cl.
CPC ......... *H02M 1/0003* (2021.05); *H02M 1/126* (2013.01); *H02M 1/325* (2021.05); *H02J 2300/24* (2020.01); *H02J 2300/28* (2020.01); *H02J 2300/30* (2020.01)

(58) Field of Classification Search
CPC ...... H02M 1/325; H02M 1/32; H02M 1/0003; H02M 1/126
See application file for complete search history.

(56) References Cited

OTHER PUBLICATIONS

Lonut Trintis, et al., "SiC Heat Pump Converters with Support for Voltage Unbalance in Distribution Grids" 2015 17th European Conference on Power Electronics and Applications (EPE'15 ECCE-Europe), Jointly Owned by EPE Association and IEEE PELS, XP032800428, DOI: 10.1109/EPE.2015.7311670, Sep. 8, 2015, pp. 1-7.

Indian Office Action dated Jun. 7, 2022 in Indian Patent Application No. 202017009148, 4 pages.
International Search Report dated Dec. 17, 2019 in PCT/JP2019/039874 filed on Oct. 9, 2019, 2 pages.
Extended European Search Report dated Aug. 4, 2020 in European Patent Application No. 19856439.5, 9 pages.
Office Action dated Dec. 17, 2020 in European Patent Application No. 19856439.5, 6 pages.
Li et al., "Decouple Control Scheme for Three Phase PWM Converter Under Inductances unbalanced Conditions", 2016 IEEE 8th International Power Electronics and Motion Control Conference (IPEMC-ECCE Asia), 2016, 8 pages, XP032924414.
"Technical requirements for the connection and operation of customer installations to the high voltage network (TCR high voltage)-English translation of VDE-AR-N 4120:2018-11", Nov. 2018, VDE Verband der Elektrotechnik Elektronik Informationstechnik e. V., pp. 83-85.
Misra, "Decoupled Vector Control of Grid Side Converter with Less Number of Sensors under imbalanced Grid Conditions", 2018 IEEE International Conference on Power Electronics, Drives and Energy Systems (PEDES), 2018, 5 pages.
Misra et al., "Control of AC-DC grid side converter with single AC current sensor", Sadhana, Indian Academy of Sciences, 2017, vol. 42, No. 12, pp. 2099-2112.
Misra et al., "Enhanced DDSRF Based Vector Control ofGrid Side Converter Using Single AC Side Current Sensor under unbalanced grid conditions", 2016 IEEE International Conference on Power Electronics, Drives and Energy Systems (PEDES), 2016, 6 pages.

* cited by examiner

POSITIVE-PHASE SEQUENCE CURRENT -----
NEGATIVE-PHASE SEQUENCE CURRENT ——

POWER CONVERSION DEVICE

TECHNICAL FIELD

The present application relates to a power conversion device.

BACKGROUND

Conventionally, for example, as described in Non-Patent Literature 1 below, various techniques relating to a grid connected power system are known.

CITATION LIST

Non-Patent Literature

[NPL1] "Technical requirements for the connection and operation of customer installations to the high voltage network (TCR high voltage)-English translation of VDE-AR-N 4120: 2018-11", November 2018, VDE Verband der Elektrotechnik Elektronik Informationstechnik e. V.

SUMMARY

Technical Problem

The grid connected power system is operated in interconnection with an electric power gird. The grid connected power system includes a DC power supply for outputting DC power, and a power conversion device for converting DC power into AC power.

In the grid connected power system, an imbalanced short circuit occurs on an output side of the power conversion device. Types of the imbalanced short circuit include a two-phase short-circuit occurring in three phases of UVW and a ground fault short-circuit occurring in one of three phases of UVW. The imbalanced short circuit causes an increase in negative-phase sequence output voltage outputted from the power conversion device. Although it is preferable to reduce the negative-phase sequence output voltage, it has not been sufficiently elucidated by conventional technology as to what kind of control can be carried out to accurately reduce the negative-phase sequence output voltage.

The present application has been made to solve the problems as described above, and an object thereof is to provide a power conversion device capable of appropriately reducing the negative-phase sequence output voltage upon occurrence of an imbalanced short circuit.

Solution to Problem

A power conversion device according to the present application includes: a power conversion circuit configured to convert DC power into three-phase AC power in accordance with a switching control signal; and a power conversion control circuit configured to generate the switching control signal based on three-phase AC output voltage and three-phase AC output current from the power conversion circuit. The power conversion control circuit is configured to calculate a positive-phase sequence current command signal based on a positive-phase sequence voltage of the three-phase AC output voltage and a positive-phase sequence current of the three-phase AC output current. The power conversion control circuit is configured to calculate a first axis negative-phase sequence voltage value being a d-axis component of negative-phase sequence voltage, a second axis negative-phase sequence voltage value being a q-axis component of the negative-phase sequence voltage, a first axis negative-phase sequence current value being a d-axis component of negative-phase sequence current, and a second axis negative-phase sequence current value being a q-axis component of the negative-phase sequence current, by executing dq-conversion of each of a measured value of the three-phase AC output voltage and a measured value of the three-phase AC output current. The power conversion control circuit is configured to calculate a first axis negative-phase sequence current command value being a d-axis component command value of the negative-phase sequence current based on the second axis negative-phase sequence voltage value, calculate a second axis negative-phase sequence current command value being a q-axis component command value of the negative-phase sequence current based on the first axis negative-phase sequence voltage value, and calculate a negative-phase sequence current command signal based on the first axis negative-phase sequence current command value, the second axis negative-phase sequence current command value, the first axis negative-phase sequence current value, and the second axis negative-phase sequence current value. The power conversion control circuit is configured to generate the switching control signal based on the positive-phase sequence current command signal and the negative-phase sequence current command signal.

Advantageous Effects

The present application discloses a novel calculation technique to calculate a first axis negative-phase sequence current command value of a d-axis component command based on a second-axis negative-phase sequence voltage value, and a second axis negative-phase sequence current command value of a q-axis component command based on a first-axis negative-phase sequence voltage value. This calculation technique makes it possible to accurately generate a negative-phase sequence current command signal for reducing negative-phase sequence voltage by injecting negative-phase sequence current.

DESCRIPTION OF EMBODIMENTS

Figure 1:
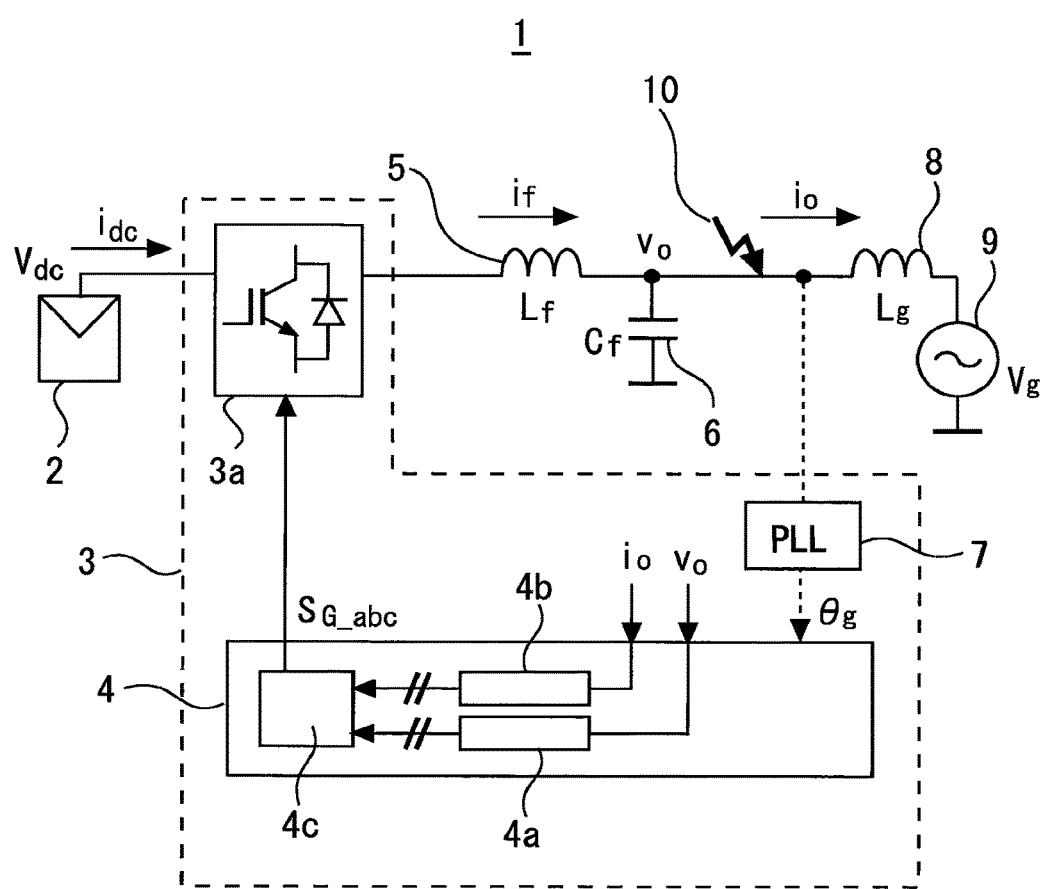
FIG. 1 is a diagram illustrating a configuration of a power conversion device according to the embodiment and a grid-connected power system using the same.

FIG. 1 is a diagram illustrating a configuration of a power conversion device 3 and a grid-connected power system 1 using the same according to the embodiment. As illustrated in FIG. 1, the grid-connected power system 1 according to the embodiment includes a DC power supply 2, the power conversion device 3, a filter reactor 5, a filter capacitor 6, and an interconnection reactor 8. The grid-connected power system 1 is interconnected with an electric power grid 9.

The DC power supply 2 outputs DC power consisting of a DC voltage $V_{dc}$ and a DC current $i_{dc}$. The power conversion device 3 converts the DC power from the DC power supply 2 into three-phase AC power. The power conversion device 3 is also referred to as a power conditioner system (PCS). The power conversion device 3 includes a power conversion circuit 3a, a power conversion control circuit 4, and a PLL circuit 7.

The power conversion circuit 3a is a three-phase voltage type inverter circuit for outputting a three-phase AC output current $i_o$ and a three-phase AC output voltage $v_o$. The power conversion circuit 3a is constructed of a plurality of semiconductor switching elements such as IGBTs or MOSFETs. The power conversion circuit 3a is configured to convert DC power into three-phase AC power in accordance with a switching control signal $S_{G\_abc}$. Since the power conversion circuit 3a may be configured of various known inverter circuits, the detailed description thereof will be omitted.

The power conversion control circuit 4 is configured to output the switching control signal $S_{G\_abc}$ based on the three-phase AC output current $i_o$ and the three-phase AC output voltage $v_o$ outputted from the power conversion circuit 3a, and a phase signal θg from a PLL circuit 7. The switching control signal $S_{G\_abc}$ is a gate drive signal for driving each of the semiconductor switching elements in the power conversion circuit 3a.

The PLL circuit 7 outputs the phase signal θg. The phase signal θg is a signal for performing phase synchronization by detecting a phase error with respect to a reference frequency signal. The phase signal θg is a positive-phase sequence phase signal θg. The output from the PLL circuit 7 also produce a negative-phase sequence phase signal (−θg) which has a negative phase opposite to the positive-phase sequence phase signal θg.

One end of the filter reactor 5 is connected to an output end of the power conversion device 3. The filter reactor 5 has an inductance Lf. One end of the filter capacitor 6 is connected to another end of the filter reactor 5, and another end of the filter capacitor 6 is connected to a reference potential such as a ground potential. The filter capacitor 6 has a capacitance Cf.

One end of the interconnection reactor 8 is connected to a connection point between the filter reactor 5 and the filter capacitor 6. Another end of the interconnection reactor 8 is connected to the electric power grid 9. The interconnection reactor 8 has an inductance Lg.

Although not illustrated in the Figures, a potential transformer is provided on the output side of the power conversion device 3. The potential transformer converts (i.e. transforms) high voltage and large current from an AC circuit into low voltage and small current. The potential transformer according to the embodiment includes a current transformer (CT) for converting the three-phase AC output current $i_o$, and a voltage transformer (VT) for converting the three-phase AC output voltage $v_o$. Current and voltage converted by these potential transformers are inputted into the power conversion control circuit 4, and these are used as a measured value of the three-phase AC output voltage $v_o$ and a measured value of the three-phase AC output current $i_o$.

Incidentally, a hardware configuration in FIG. 1 is an example. As a modification, a LC-type AC filter circuit formed of the filter reactor 5 and the filter capacitor 6 may be included inside the power conversion device 3. The PLL circuit 7 may be provided outside the power conversion device 3.

The grid-connected power system 1 according to the embodiment is, for example, a photovoltaic power generation system, in which case the DC power supply 2 is a photovoltaic cell array. Another example of the grid-connected power system 1 is an energy storage system (ESS), in which case the DC power supply 2 may be a storage battery or a fuel cell and the like. Another example of the grid-connected power system 1 is a wind power generation system, in which case the DC power supply 2 includes a wind generator and an AC/DC conversion circuit (i.e., an AC/DC converter).

In the embodiment, the grid-connected power system 1 is provided with a technique for suppressing a negative-phase sequence voltage when an imbalanced short circuit 10 has occurred as illustrated in FIG. 1. Types of the imbalanced short circuit 10 include two-phase short-circuit occurring between the three phases of UVW and a ground fault short-circuit in which one of the three phases of UVW is grounded. In addition, the two-phase short circuit has some variations in which two phases making the short circuit in the three phases of UVW are different. Therefore, the type of two-phase short circuit includes a UV-phase short circuit, a VW-phase short circuit, and a UW-phase short circuit. A grid configuration includes transformers, power distribution lines, and grid impedances and the like, on a side of the electric power gird 9.

Figure 2:
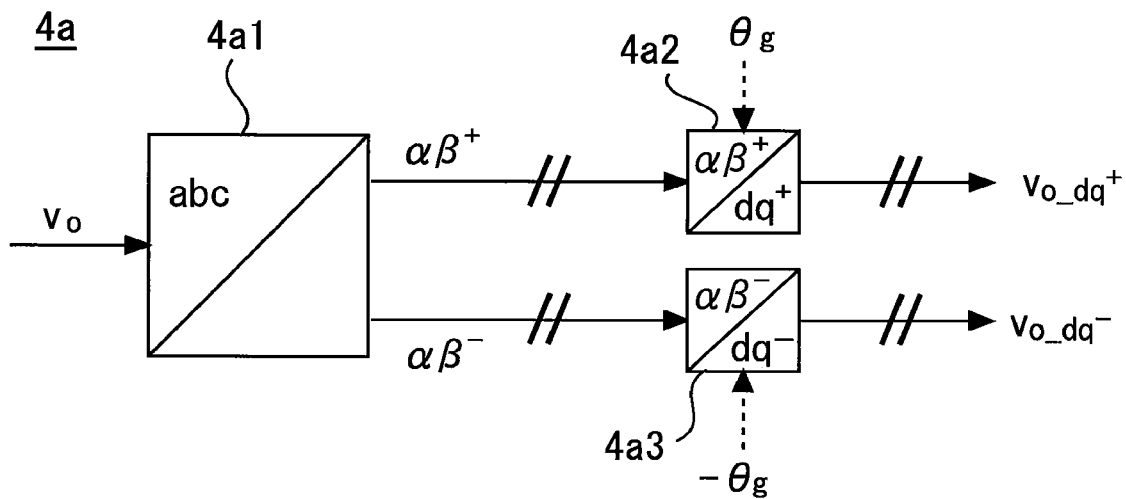
FIG. 2 is a diagram illustrating a configuration of a voltage conversion part of a power conversion control device according to the embodiment.

FIG. 2 is a diagram illustrating a configuration of a voltage conversion part 4a in the power conversion control circuit 4 according to the embodiment. The voltage conversion part 4a includes a first voltage conversion block 4a1, a second voltage conversion block 4a2, and a third voltage conversion block 4a3.

As shown in FIG. 2, the first voltage conversion block 4a1 executes an abc/αβ-conversion to the measured value of the three-phase AC output voltage $v_o$. Thereby, the first voltage conversion block 4a1 converts an AC output voltage having three-phase (abc) into each of an alpha beta two-phase positive-phase sequence voltage (αβ+) and an alpha beta two-phase negative-phase sequence voltage (αβ−). Incidentally, each of the three-phase abc is associated with each of the three-phase UVW as described above.

The second voltage conversion block 4a2 outputs a two-phase positive-phase sequence voltage (dq+) by applying αβ/dq-conversion to the two-phase positive-phase sequence voltage (αβ+) based on the positive-phase sequence phase signal (θg).

The third voltage conversion block 4a3 outputs a two-phase negative-phase sequence voltage (dq−) by applying the αβ/dq-conversion to the two-phase negative-phase sequence voltage (αβ−) based on the negative-phase sequence phase signal (−θg).

As also described in FIG. 2, a positive-phase sequence voltage $v_{o\_dq+}$ outputted from the second voltage conversion block 4a2 is represented by the following equation (1). The positive-phase sequence voltage $v_{o\_dq+}$ is a signal consisting of a pair of $v_{o\_d+}$ and $v_{o\_q+}$. $v_{o\_d+}$ is a first-axis positive-phase sequence voltage value which is a d-axis component of the positive-phase sequence voltage. $v_{o\_q+}$ is a second-axis positive-phase sequence voltage value which is a q-axis component of the positive-phase sequence voltage.

[Expression 1]

$$v_{o\_dq+}=(v_{o\_d+}, v_{o\_q+}) \quad (1)$$

Further, a negative-phase sequence voltage $v_{o\_dq-}$ outputted from the third voltage conversion block 4a3 is also represented by the following equation (2). The negative-phase sequence voltage $v_{o\_dq-}$ is a signal consisting of a pair of $v_{o\_d-}$ and $v_{o\_q-}$. $v_{o\_d-}$ is a first-axis negative-phase sequence voltage value which is a d-axis component of the negative-phase sequence voltage. $v_{o\_q+}$ is a second-axis negative-phase sequence voltage value is a q-axis component of the negative-phase sequence voltage.

[Expression 2]

$$v_{o\_dq-}=(v_{o\_d-}, v_{o\_q-}) \quad (2)$$

Figure 3:
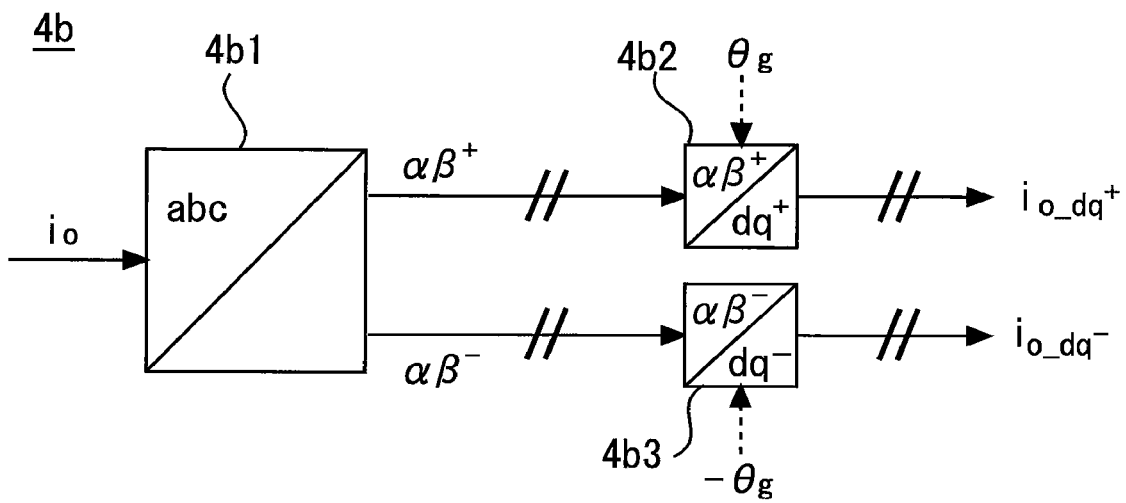
FIG. 3 is a diagram illustrating a configuration of a current conversion part of the power conversion control device according to the embodiment.

FIG. 3 is a diagram illustrating a configuration of a current conversion part 4b in the power conversion control circuit 4 according to the embodiment. The current conversion part 4b includes a first current conversion block 4b1, a second current conversion block 4b2, and a third current conversion block 4b3.

As shown in FIG. 3, the first current conversion block 4b1 executes an abc/αβ-conversion to the measured values of the three-phase AC output current $i_o$. Thereby, the first current conversion block 4b1 converts an AC output current having three-phase (abc) into each of an alpha beta two-phase positive-phase sequence current (αβ+) and an alpha beta two-phase negative-phase sequence current (αβ−).

The second current conversion block 4b2 outputs a two-phase positive-phase sequence current $i_{o\_dq+}$ by applying the αβ/dq-conversion to the two-phase positive-phase sequence current (αβ+) based on a positive-phase sequence phase signal (θg).

The third current conversion block 4b3 outputs a two-phase negative-phase sequence current $i_{o\_dq-}$ by applying the αβ/dq-conversion to the two-phase negative-phase current (αβ−) based on the negative-phase sequence phase signal (−θg).

As also described in FIG. 3, the positive-phase sequence current $i_{o\_dq+}$ outputted from the second current conversion block 4b2 is represented by the following equation (3), which is a signal consisting of a pair of $i_{o\_d+}$ and $i_{o\_q+}$. $i_{o\_d+}$ is a first-axis positive-phase sequence current value which is a d-axis component of the positive-phase sequence current. $i_{o\_q+}$ is a second-axis positive-phase sequence current value which is a q-axis component of the positive-phase sequence current.

[Expression 3]

$$i_{o\_dq+}=(i_{o\_d+}, i_{o\_q+}) \quad (3)$$

Further, the negative-phase sequence current $i_{o\_dq-}$ outputted from the third current conversion block 4b3 is also represented by the following equation (3), which is a signal consisting of a pair of $i_{o\_d-}$ and $i_{o\_q-}$. $i_{o\_d-}$ is a first-axis negative-phase sequence current value which is a d-axis component of the negative-phase sequence current. $i_{o\_q-}$ is a second-axis negative-phase sequence current value which is a q-axis component of the negative-phase sequence current.

[Expression 4]

$$i_{o\_dq-}=(i_{o\_d-}, i_{o\_q-}) \quad (4)$$

As can be seen from FIGS. 2 and 3, each of the voltage conversion part 4a and the current conversion part 4b executes a dq-conversion to each of the measured value of the three-phase AC output voltage $v_o$ and the measured value of the three-phase AC output current $i_o$, and thereby a plurality of output values ($v_{o\_d+}$, $v_{o\_q+}$, $v_{o\_d-}$, $v_{o\_q-}$, $i_{o\_d+}$, $i_{o\_q+}$, $i_{o\_d-}$, and $i_{o\_q-}$) are calculated.

Figure 4:
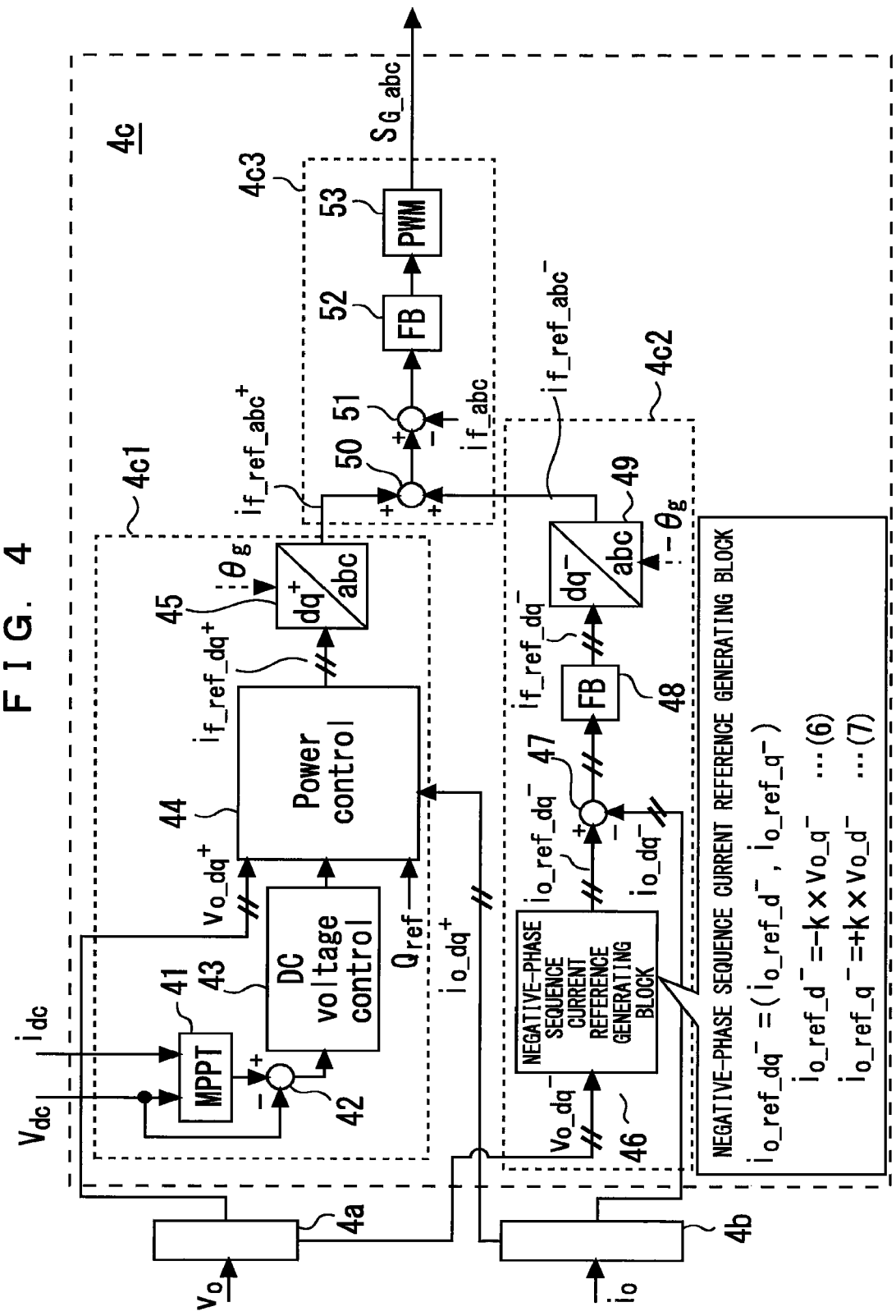
FIG. 4 is a diagram illustrating a configuration of a control signal computing part of the power conversion control device according to the embodiment.

FIG. 4 is a diagram illustrating a configuration of a control signal computing part 4c in the power conversion control device according to the embodiment. The control signal computing part 4c includes a positive-phase sequence control block 4c1, a negative-phase sequence control block 4c2, and a gate signal generating block 4c3.

The positive-phase sequence control block 4c1 calculates a three-phase positive-phase sequence current command signal $i_{f\_ref\_abc+}$ based on the positive-phase sequence voltage of the three-phase AC output voltage $v_o$ and the positive-phase sequence current of the three-phase AC output current $i_o$ each received from the voltage conversion part 4a and the current conversion part 4b. The positive-phase sequence control block 4c1 includes a MPPT control block 41, a subtracting block 42, a DC-voltage control block 43, a power control block 44, and a first inverse conversion block 45.

The MPPT control block 41 executes a Maximum Power Point Tracking control for maximizing electric power from the photovoltaic cell array of the DC power supply 2. In the embodiment, although the MPPT control block 41 is provided because the DC power supply 2 is assumed to be a photovoltaic cell array, the MPPT control block 41 may not be provided if the DC power supply 2 is another DC power supply other than a photovoltaic cell array.

The subtracting block 42 calculates difference between an output signal from the MPPT control block 41 and a DC voltage $V_{dc}$ of the DC power supply 2. The DC voltage control block 43 executes DC voltage control based on an output signal from the subtracting block 42.

The power control block 44 calculates a two-phase positive-phase sequence current command signal $i_{f\_ref\_dq+}$ based on an output signal from the DC voltage control block 43, a reactive power command value $Q_{ref}$, an output signal from the voltage conversion part 4a, and an output signal from the current conversion part 4b.

The first inverse conversion block 45 executes a two-phase/three-phase conversion (i.e. a dq/abc-conversion) with respect to the two-phase positive-phase sequence current command signal $i_{f\_ref\_dq+}$. The first inverse conversion block 45 is configured to calculate a three-phase positive-phase sequence current command signal $i_{f\_ref\_abc+}$ by executing the dq/abc-transform.

The negative-phase sequence control block 4c2 calculates a three-phase negative-phase sequence current command signal $i_{f\_ref\_abc-}$ based on the negative-phase sequence voltage of the three-phase AC output voltage $v_o$ and the negative-phase sequence current of the three-phase AC output current $i_o$ which are respectively received from the voltage conversion part 4a and the current conversion part 4b. The negative-phase sequence control block 4c2 includes a negative-phase sequence current reference generating block 46, a subtracting block 47, a first feedback control block 48, and a second inverse conversion block 49.

The negative-phase sequence current reference generating block 46 calculates a two-phase negative-phase sequence current command signal $i_{o\_ref\_dq-}$, specifically by executing arithmetic processing defined by the following formulas (5) to (7) which are also described in FIG. 4. The two-phase negative-phase sequence current command signal $i_{o\_ref\_dq-}$ consists of a pair of a first axis negative-phase sequence current command value $i_{o\_ref\_d-}$ and a second axis negative-phase sequence current command value $i_{o\_req\_q-}$ as described in Equation (5) below.

[Expression 5]

$$i_{o\_ref\_dq-} = (i_{o\_ref\_d-}, i_{o\_ref\_q-}) \quad (5)$$

The negative-phase sequence current reference generating block 46 calculates a first axis negative-phase sequence current command value $i_{o\_ref\_d-}$ which is a d-axis component command of the negative-phase sequence current based on the second axis negative-phase sequence voltage value $v_{o\_q-}$. This calculation is expressed by the following equation (6).

[Expression 6]

$$i_{o\_ref\_d-} = -k \times v_{o\_q-} \quad (6)$$

Furthermore, the negative-phase sequence current reference generating block 46 calculates a second axis negative-phase sequence current command value $i_{o\_ref\_q-}$ which is a q-axis component command of the negative-phase sequence current based on the first axis negative-phase sequence voltage value $v_{o\_d-}$. This calculation is expressed by the following equation (7).

[Expression 7]

$$i_{o\_ref\_q-} = +k \times v_{o\_d-} \quad (7)$$

In the above Equation (6), the negative-phase sequence current command value of the d-axis component is generated from the negative-phase sequence voltage value of the q-axis component. On the other hand, in Equation (7), the negative-phase sequence current command value of the q-axis component is generated from the negative-phase sequence voltage value of the d-axis component. The technique that d-axis component and q-axis component are associated with each other in processing operation is one of the features of the embodiment. In addition, in the embodiment, there is a difference Expression (6) includes a coefficient of minus k whereas Expression (7) includes a coefficient is plus k. Incidentally, the coefficient k is a predetermined coefficient. The coefficient k may be the same numerical value in Equation (6) and Equation (7), and the coefficient k in Equation (6) and the coefficient k in Equation (7) may have different magnitudes with each other so that one may be larger than the other.

Figure 9:
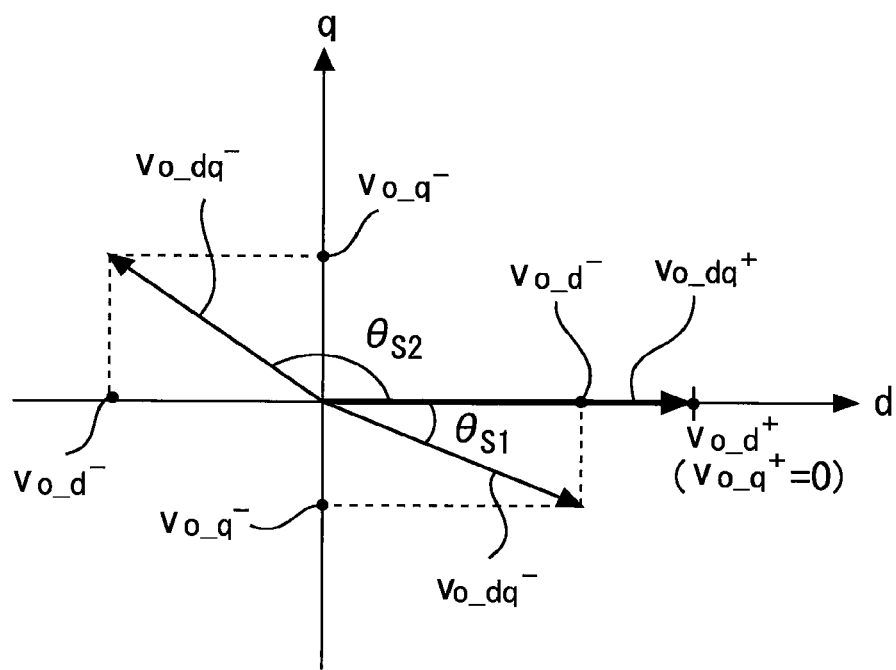
FIG. 9 is a graph for explaining operation of the power conversion device according to the embodiment.

FIG. 9 is a graph for explaining operation of the power conversion device 3 according to the embodiment. FIG. 9 illustrate the positive-phase sequence voltage $v_{o\_dq+}$, and also illustrate a state in which the q-axis component $v_{o\_q+}$ is zero. Referring to FIG. 9, since a reference phase is generated based on the positive-phase sequence voltage $v_{o\_dq+}$ by the PLL circuit 7, it can be recognized that both the d-axis component and the q-axis component of the negative-phase sequence voltage $v_{o\_dq-}$ has a value other than zero. A phase θs of the negative-phase sequence voltage $v_{o\_dq-}$ can vary depending on the type of the imbalanced short circuit and grid configuration (see, for example, $θ_{s1}$ and $θ_{s2}$ in FIG. 9).

The subtracting block 47 calculates difference between the two-phase negative-phase sequence current command signal $i_{o\_ref\_dq-}$ and the two-phase negative-phase sequence current $i_{o\_dq-}$. Specifically, the subtracting block 47 calculates difference between the first axis negative-phase sequence current command value $i_{o\_ref\_d-}$ and the first axis negative-phase sequence current value $i_{o\_d-}$. At the same time, the subtracting block 47 calculates difference between the second axis negative-phase sequence current command value $i_{o\_ref\_q-}$ and the second axis negative-phase sequence current value $i_{o\_q-}$.

The first feedback control block 48 is configured to execute feedback control to a two-phase output signal from the subtracting block 47. The first feedback control block 48 according to the embodiment is configured to execute proportional integral control (PI control), as one example. As a modification, the first feedback control block 48 may execute other known feedback control such as P control, D control, I control, PD control, or PID control and the like.

The second inverse conversion block 49 executes a two-phase/three-phase conversion (i.e., dq/abc-conversion) to the two-phase negative-phase current command signal if_ref_dq- after feedback control outputted from the first feedback control block 48 based on the negative-phase sequence phase signal ($-θ_g$). The second inverse conversion block 49 is configured to calculate a three-phase negative-phase sequence current command signal $i_{f\_ref\_abc-}$ by executing this dq/abc-conversion.

The gate signal generating block 4c3 is configured to generate the switching control signal $S_{G\_abc}$ based on the three-phase positive-phase sequence current command signal $i_{f\_ref\_abc+}$ and the three-phase negative-phase sequence current command signal $i_{f\_ref\_abc-}$. The gate signal generating block 4c3 includes an adding block 50, and a subtracting block 51, a second feedback control block 52, and a PWM signal generating block 53.

The adding block 50 adds the three-phase positive-phase sequence current command signal $i_{f\_ref\_abc+}$ and the three-phase negative-phase sequence current command signal $i_{f\_ref\_abc-}$. The subtracting block 51 calculates difference between the output from the adding block 50 and a three-phase AC output current value $i_{f\_abc}$ flowing through the filter reactor 5. The three-phase AC output current value $i_{f\_abc}$ is a value acquired from the output current value ($i_f$) of the power conversion circuit 3a in FIG. 1 by providing a current transformer (CT) not illustrated therein.

The second feedback control block 52 is configured to execute feedback control to a three-phase output signal from the subtracting block 51. The second feedback control block 52 according to the embodiment is configured to execute proportional control (P control), as one example. As a modification, the second feedback control block 52 may execute other known feedback control such as D control, I control, PI control, PD control, or PID control and the like.

The PWM signal generating block 53 generates the switching control signal $S_{G\_abc}$ as a gate driving signal of each semiconductor switching element in the power conversion circuit 3a based on the three-phase output signal from the second feedback control block 52.

In a case where a photovoltaic power conversion device does not have a battery system, it is usual that active power flows only to a side of an electric power grid and the active power does not flow in the opposite direction. Further, DSP (Digital Signal Processor) software is often provided with only the positive-phase sequence control block 4c1 for controlling only positive-phase sequence current.

In the embodiment, the negative-phase sequence control block 4c2 is provided in order to address the imbalanced short circuit described above. A novel technical idea found by the present inventor is such that d-axis negative-phase sequence current can suppress q-axis negative-phase sequence voltage while q-axis negative-phase sequence current can suppress d-axis negative-phase sequence voltage.

Based on this novel technical idea, the device configuration in the embodiment implements a calculation technique in which the first axis negative-phase sequence current command value $i_{o\_ref\_d-}$ of d-axis component command is calculated based on the second axis negative-phase sequence voltage value $v_{o\_q-}$ of q-axis component while the second axis negative-phase sequence current command value $i_{o\_ref\_q-}$ of q-axis component command is calculated based on the first axis negative-phase sequence voltage value $v_{o\_d-}$ of d-axis component. This calculation technique makes it possible to accurately calculate the three-phase negative-phase sequence current command signal $i_{f\_ref\_abc-}$ when reducing negative-phase sequence voltage by injecting negative-phase sequence current.

Figure 5:
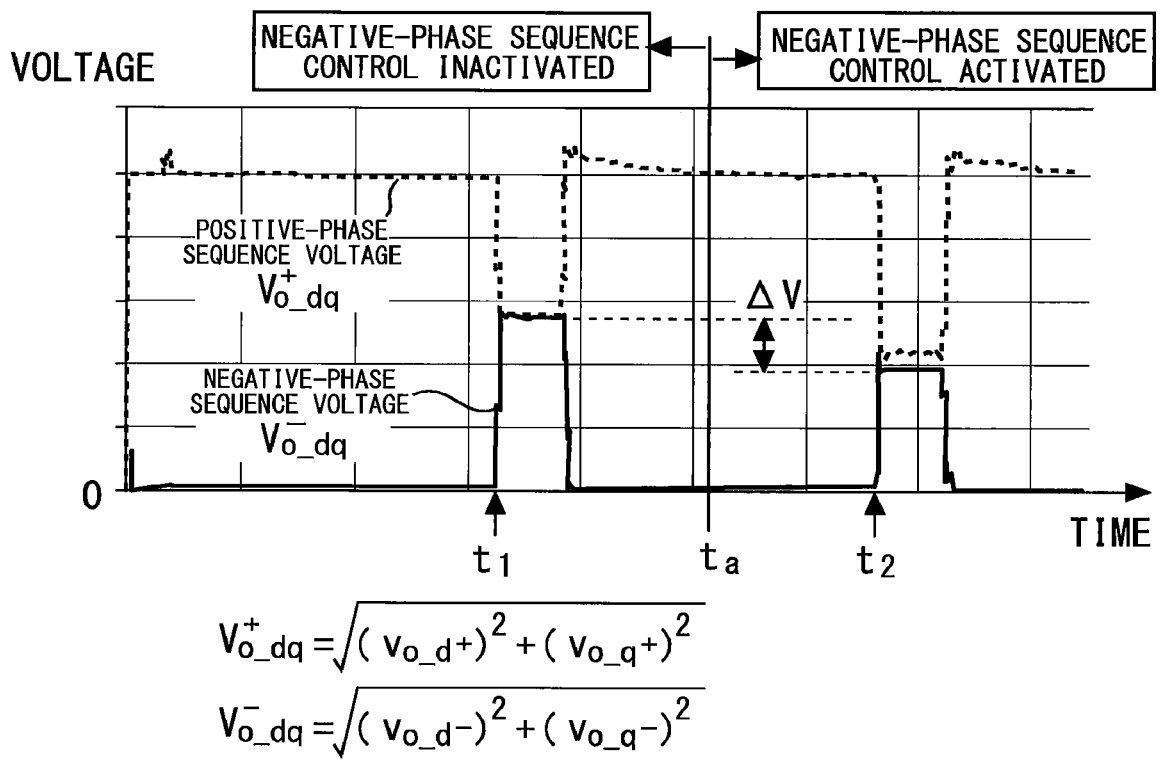
FIG. 5 is a timing diagram for explaining effect of the power conversion device according to the embodiment.

FIGS. 5 to 8 are timing diagrams for explaining effects of the power conversion device according to the embodiment. When the imbalanced short circuit 10 (also referred to as imbalance failure) occurs in the grid-connected power system 1 as described in FIG. 1, the negative-phase sequence voltage $V^-_{o\_dq}$ increases as illustrated in FIG. 5. Incidentally, positive-phase sequence voltage $V^+_{o\_dq}$ and the negative-phase sequence voltage $V^-_{o\_q}$ in FIG. 5 are values calculated by the following equations (8) and equation (9).

[Expression 8]

$$v_{o\_dq}{}^+ = \sqrt{(v_{o\_d}{}^+)^2 + (v_{o\_q}{}^+)^2} \quad (8)$$

[Expression 9]

$$i\ v_{o\_dq}{}^- = \sqrt{(v_{o\_d-})^2 + (v_{o\_q-})^2} \quad (9)$$

A horizontal axis in FIGS. 5 to 8 represents time, each time point t1, ta and t2 is common in FIGS. 5 to 8, and the negative-phase sequence control block 4c2 starts to operate at the time point ta.

Each of FIGS. 5 to 8 illustrates operation in which the negative-phase sequence control block 4c2 is switched from OFF to ON, and thereby each of FIGS. 5 to 8 illustrates difference in effects due to activation or inactivation of the negative-phase sequence control block 4c2, for convenience. Therefore, control is switched at time ta from a negative-phase sequence control inactivated period to a negative-phase sequence control activated period.

In the embodiments, the negative-phase sequence control block 4c2 may be constantly activated, thereby constantly exhibiting effects of "reverse phase control activation." Incidentally, the negative-phase sequence voltage $V^-_{o\_dq}$ increases due to occurrence of the imbalanced short-circuit at each of time t1 and time t2 in FIGS. 5 to 8, and thereafter the negative-phase sequence voltage $V^-_{o\_dq}$ falls after a predetermined time has elapsed, because this is a simulation waveform for explaining effects. In practice, the negative-phase sequence voltage $V^-_{o\_dq}$ increases due to occurrence of the imbalanced short circuit, and thereafter the negative-phase sequence voltage $V^-_{o\_dq}$ is maintained, until the imbalanced short circuit is eliminated, unless some countermeasure is taken.

In the embodiment, the negative-phase sequence control block 4c2 according to the embodiment is activated when the imbalanced short circuit occurs. By activating the negative-phase sequence control block 4c2, each negative-phase sequence current of d-axis and q-axis is injected.

Figure 7:
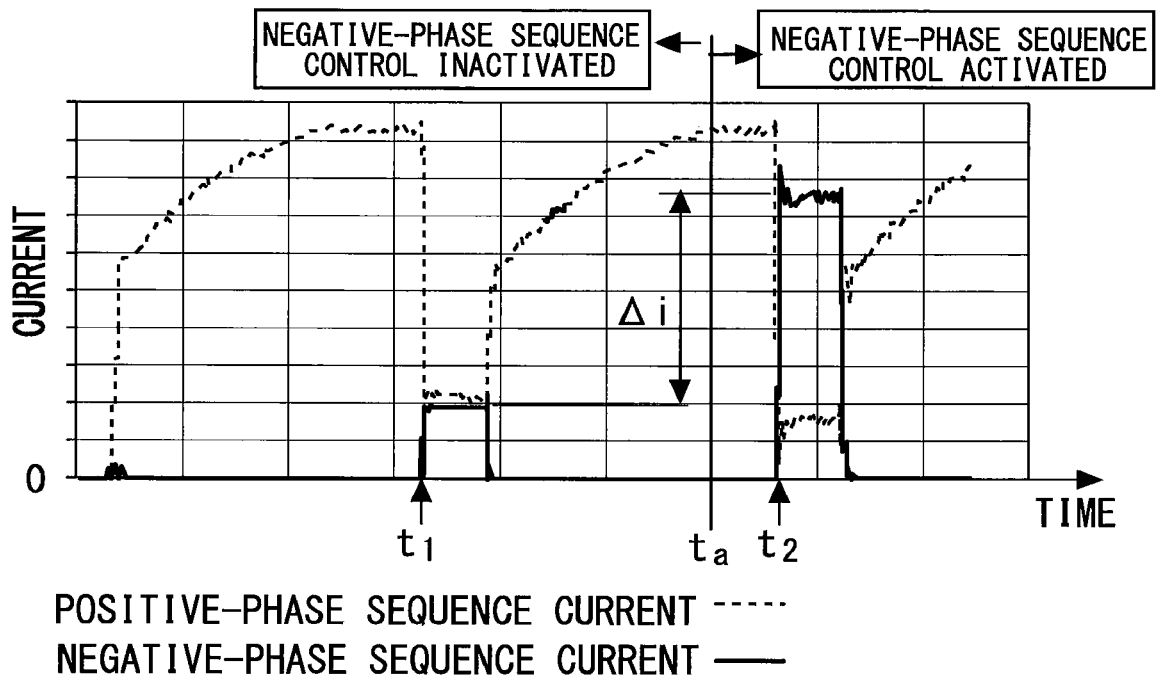
FIG. 7 is a timing diagram for explaining the effect of the power conversion device according to the embodiment.

The negative-phase sequence current is injected by the negative-phase sequence control block 4c2, and thereby the negative-phase sequence current is increased by Δi as shown in FIG. 7 when the negative-phase sequence control is activated, as compared with the inactivated state of the negative-phase sequence control. The negative-phase sequence current having a magnitude of Δi is injected by the negative-phase sequence control activation in FIG. 7, and thereby it is possible to reduce the negative-phase sequence voltage $V^-_{o\_dq}$ by ΔV as shown in FIG. 5 when the negative-phase sequence control is enabled, as compared with the inactivated state of the negative-phase sequence control.

When the negative-phase sequence voltage is increased by the imbalanced short circuit, there is a problem that three-phase voltage imbalance occurs so that each amplitude of each phase in the three-phase AC output voltage $v_o$ is greatly different from each other. The embodiment can suppress the negative-phase sequence voltage at the time of occurrence of the imbalanced short circuit, and therefore it is possible to suppress such three-phase voltage imbalance.

Figure 6:
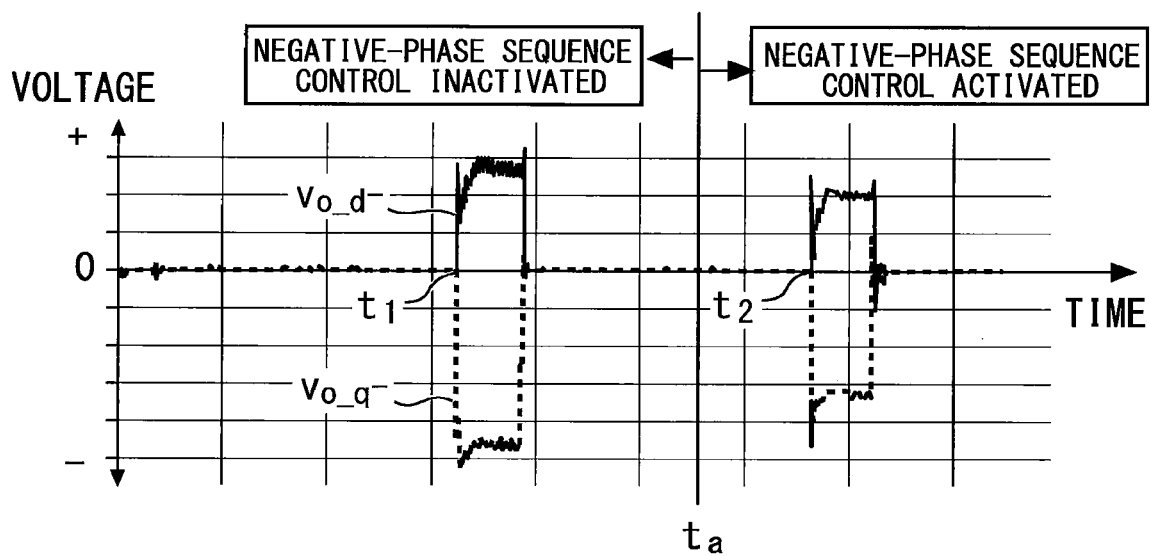
FIG. 6 is a timing diagram for explaining the effect of the power conversion device according to the embodiment.
Figure 8:
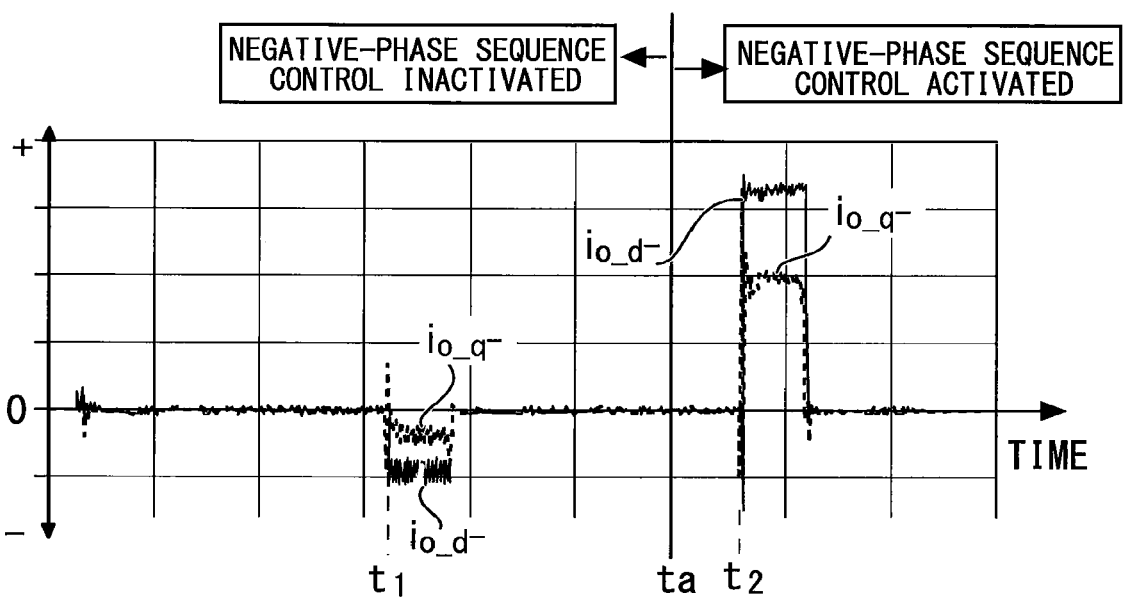
FIG. 8 is a timing diagram for explaining the effect of the power conversion device according to the embodiment.

Incidentally, FIG. 6 illustrates a case where a positive/negative sign is different between d-axis component and q-axis component of the negative-phase sequence voltage and absolute values thereof are different from each other, as an example. However, other cases may occur depending on a mode of the imbalanced short circuit. Furthermore, FIG. 8 illustrates a case where the positive/negative sign is common in d-axis component and q-axis component of the negative phase electric current and the absolute values thereof are different from each other. However, other cases may occur depending on a mode of the imbalanced short circuit.

The power conversion control circuit 4 according to the embodiment executes two types of calculation according to the above equations (6) and (7). At least one of the calculation of the first calculation and the second calculation is preferably executed. The first calculation of the two types of calculation is configured to increase an absolute value of the second-axis negative-phase sequence current command value $i_{o\_ref\_q-}$ accordance with the above equation (7) as the first-axis negative-phase sequence voltage value $v_{o\_d-}$ increases.

The second calculation of the two types of calculation is configured to increases an absolute value of the first axis negative-phase sequence current command value $i_{o\_ref\_d-}$ in accordance with the above equation (6) as the second axis negative-phase sequence voltage value $v_{o\_q-}$ increases. However, on the right side of the equation (6), the coefficient minus k is multiplied. Therefore, the equation (6) calculates a value of the first axis negative-phase sequence current command value $i_{o\_ref\_d-}$ so that it increases toward a minus side as the second axis negative-phase sequence voltage value $v_{o\_q-}$ increases.

In the embodiment, the power conversion control circuit 4 is preferably configured to execute "filter operation" for applying dq-conversion to each of the measured value of the three-phase AC output voltage $v_o$ and the measured value of the three-phase AC output current $i_o$. The filter operation is operation to suppress that a second harmonic component of a grid frequency is included in a dq-converted signal.

In the embodiment, the power conversion control circuit 4 may execute the above "filter operation" in such a manner that an αβ-axis negative-phase sequence component is extracted by applying an-conversion to each of the measured value of the three-phase AC output voltage vo and the measured value of the three-phase AC output current $i_o$, and thereafter dq-conversion is applied to the αβ-axis negative-phase sequence component. This is because the second harmonic can be eliminated by interposing the three-phase/αβ conversion.

Figure 10:
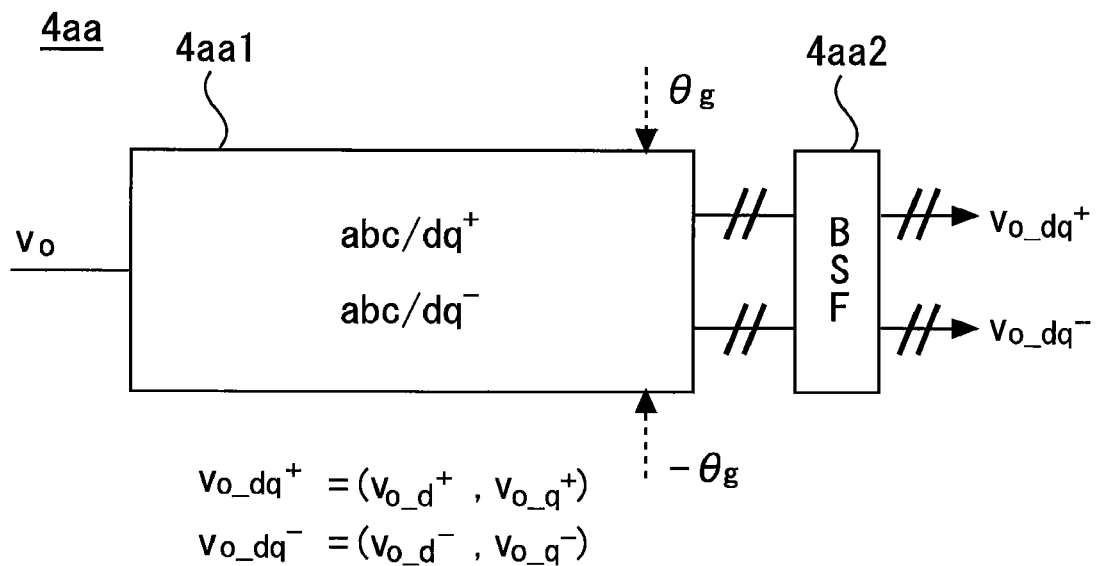
FIG. 10 is a diagram illustrating a configuration of a voltage conversion part of a power conversion control device according to a modification of the embodiment.
Figure 11:
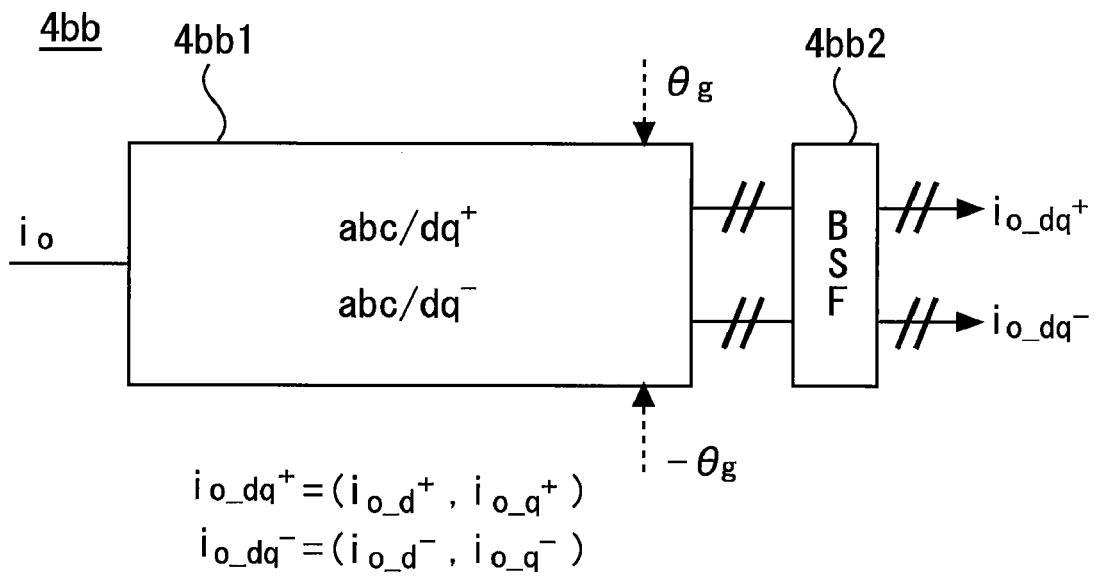
FIG. 11 is a diagram illustrating a configuration of a current conversion part of the power conversion control device according to a modification of the embodiment.

FIG. 10 is a diagram illustrating a configuration of a voltage conversion part 4aa in the power conversion control circuit 4 according to a modification of the embodiment. FIG. 11 is a diagram illustrating a configuration of a current conversion part 4bb in the power conversion control circuit 4 according to a modification of the embodiment.

The power conversion control circuit 4 may include band stop filters 4aa2, 4bb2 each performing the above described "filter operation." As shown in FIG. 10, the voltage conversion part 4aa according to the modification may include a voltage conversion block 4aa1 and the band stop filter 4aa2. As shown in FIG. 11, the current conversion part 4bb according to the modification may include a current conversion block 4bb1 and the band stop filter 4bb2.

The band stop filter 4aa2 and the band stop filter 4bb2 are filters not to pass the second harmonic of a grid voltage frequency. The second harmonic not to be passed is a frequency twice of the grid voltage frequency. Specifically, the second harmonic not to be passed is, for example, a signal having a frequency of 100 Hz to 120 Hz if the grid voltage frequency is such as 50 Hz to 60 Hz and the like.

REFERENCE SIGNS LIST

1 Grid-connection electric power system
2 DC powersupply
3 Power conversion device
3a Power conversion circuit
4 Power conversion control circuit
4a, 4aa Voltage conversion part
4a1 First voltage conversion block
4a2 Second voltage conversion block
4a3 Third voltage conversion block
4aa1 Voltage conversion block
4aa2 Band stop filter
4b, 4bb Current conversion part
4b1 First current conversion block
4b2 Second current conversion block
4b3 Third current conversion block
4bb1 Current conversion block
4bb2 Band stop filter
4c Control signal computing part
4c1 Positive-phase sequence control block
4c2 Negative-phase sequence control block
4c3 Gate signal generating block
5 Filter reactor
6 Filter capacitor
7 PLL circuit
8 interconnection reactor
9 Electric power grid
10 Imbalanced short circuit
41 MPPT control block
42, 47, 51 Subtracting block
43 DC voltage control block
44 Power control block
45 First inverse conversion block
46 Negative-phase sequence current reference generating block
45 First feedback control block
49 Second inverse conversion block
50 Adding block
52 Second feedback control block
53 PWM signal generating block
$i_{f\_abc}$ Three-phase AC output current value
$i_{f\_ref\_abc+}$ Three-phase positive-phase sequence current command signal
$i_{f\_ref\_abc-}$ Three-phase negative-phase sequence current command signal
$i_{f\_ref\_dq+}$ Two-phase positive-phase sequence current command signal
$i_{f\_ref\_dq-}$ Two-phase negative-phase sequence current command signal
$i_o$ Three-phase AC output current
$i_{o\_dq+}$ Two-phase positive-phase sequence current
$i_{o\_dq-}$ Two-phase negative-phase sequence current
$i_{o\_d+}$ First axis positive-phase sequence current
$i_{o\_q+}$ Second axis positive-phase sequence current
$i_{o\_d-}$ First axis negative-phase sequence current
$i_{o\_q-}$ Second axis negative-phase sequence current
$i_{o\_ref\_dq-}$ Negative-phase sequence current command signal
$i_{o\_ref\_d-}$ First axis negative-phase sequence current command value
$i_{o\_ref\_q-}$ Second-axis negative-phase sequence current command value
$S_{G\_abc}$ Switching control signal
$V_{dc}$ DC voltage
$v_o$ Three-phase AC output voltage
$v_{o\_dq+}$ Positive-phase sequence voltage
$v_{o\_dq-}$ Negative-phase sequence voltage
$v_{o\_d+}$ First axis positive-phase sequence voltage
$v_{o\_q-}$ Second-axis positive-phase sequence voltage
$v_{o\_d-}$ First axis negative-phase sequence voltage
$v_{o\_q-}$ Second axis negative-phase sequence voltage
$\theta_g$ Positive-phase sequence phase signal
$-\theta_g$ Negative-phase sequence phase signal
$\theta_s$ Phase

The invention claimed is:

1. A power conversion device comprising:
a power conversion circuit configured to convert DC power into three-phase AC power in accordance with a switching control signal; and
a power conversion control circuit configured to generate the switching control signal based on three-phase AC output voltage and three-phase AC output current from the power conversion circuit,
wherein the power conversion control circuit is configured to
calculate a positive-phase sequence current command signal based on a positive-phase sequence voltage of the three-phase AC output voltage and a positive-phase sequence current of the three-phase AC output current,
calculate a first axis negative-phase sequence voltage value being a d-axis component of negative-phase sequence voltage, a second axis negative-phase sequence voltage value being a q-axis component of the negative-phase sequence voltage, a first axis negative-phase sequence current value being a d-axis component of negative-phase sequence current, and a second axis negative-phase sequence current value being a q-axis component of the negative-phase sequence current, by executing dq-conversion of each of a measured value of the three-phase AC output voltage and a measured value of the three-phase AC output current,
calculate a first axis negative-phase sequence current command value being a d-axis component command value of the negative-phase sequence current based on the second axis negative-phase sequence voltage value,
calculate a second axis negative-phase sequence current command value being a q-axis component command value of the negative-phase sequence current based on the first axis negative-phase sequence voltage value,
calculate a negative-phase sequence current command signal based on the first axis negative-phase sequence current command value, the second axis negative-phase sequence current command value, the first axis negative-phase sequence current value, and the second axis negative-phase sequence current value, and generate the switching control signal based on the positive-phase sequence current command signal and the negative-phase sequence current command signal.

2. The power conversion device according to claim 1, wherein the power conversion control circuit is configured to execute at least one operation of first operation and second operation, wherein the first operation is to increase an absolute value of the second axis negative-phase sequence current command value as the first axis negative-phase sequence voltage value increases, and wherein the second operation is to increase an absolute value of the first axis negative-phase sequence current command value as the second axis negative-phase sequence voltage value increases.

3. The power conversion device according to claim 1, wherein the power conversion control circuit is configured to execute filter operation for suppressing inclusion of a second harmonic component of a grid frequency in a dq-converted signal when applying dq-conversion to each of a measured value of the three-phase AC output voltage and a measured value of the three-phase AC output current.

4. The power conversion device according to claim 3, wherein the power conversion control circuit is configured to execute the filter operation in such a manner that an 4-axis negative-phase sequence component is extracted by applying $\alpha\beta$-conversion to each of the measured value of the three-phase AC output voltage and the measured value of the three-phase AC output current, and thereafter dq-conversion is applied to the $\alpha\beta$-axis negative-phase sequence component.

5. The power conversion device according to claim 3, wherein the power conversion control circuit includes a band stop filter for performing the filter operation.

\* \* \* \* \*